United States Patent
Bassett et al.

(10) Patent No.: US 6,747,827 B1
(45) Date of Patent: Jun. 8, 2004

(54) ERROR CORRECTION CODES APPLIED VARIABLY BY DISK ZONE, TRACK, SECTOR, OR CONTENT

(75) Inventors: Stephen J. Bassett, Ft. Collins, CO (US); Daniel Woods, Longmont, CO (US); Michael James, Longmont, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/536,282

(22) Filed: Mar. 27, 2000

(51) Int. Cl.[7] ................................................. G11B 5/09
(52) U.S. Cl. ................................................. 360/53; 360/39
(58) Field of Search ........................ 360/53, 43, 39, 360/77.04

(56) References Cited

U.S. PATENT DOCUMENTS

| | | | | |
|---|---|---|---|---|
| 4,914,527 A | * | 4/1990 | Asai et al. | 360/49 |
| 5,956,305 A | * | 9/1999 | Takahashi | 369/47.17 |
| 6,079,043 A | * | 6/2000 | Yoshiura et al. | 360/77.02 |
| 6,260,170 B1 | * | 7/2001 | Lee | 360/53 |
| 6,519,715 B1 | * | 2/2003 | Takashi et al. | 360/53 |

* cited by examiner

Primary Examiner—David Hudspeth
Assistant Examiner—Rocio Colon
(74) Attorney, Agent, or Firm—W. Daniel Swayze, Jr.; W. James Brady; Frederick J. Telecky, Jr.

(57) ABSTRACT

A method for performing error correction code operations on data to be read from the disk (12) of a hard disk drive (10) includes applying a first error correction code algorithm to a first set of data to be written to the hard disk drive, and a second error correction code algorithm, different from the first, to a second set of data to be written to the hard disk drive (10). The first and second error correction code algorithms may for example produce a different number of error correction code bits for application to said data. The selection between the first and second algorithms may be made, for instance, in dependence upon the physical locations (76, 78) on the disk, or in dependence upon the type of said data (80) to be written. By reducing the number of ECC bits that need be associated with at least some of the data to be written to the disk (12), the available space on the disk for user data can be increased.

12 Claims, 2 Drawing Sheets

ERROR CORRECTION CODES APPLIED VARIABLY BY DISK ZONE, TRACK, SECTOR, OR CONTENT

BACKGROUND OF THE INVENTION

1. Field of the invention

This invention relates to improvements in mass data storage devices, or the like, and methods for operating same, and more particularly to improvements in methods for applying and using error correcting codes in the operation of mass data storage devices, or the like.

2. Relevant Background

Mass data storage devices include well known hard disk drives that have one or more spinning magnetic disks or platters onto which data is recorded for storage and subsequent retrieval. Hard disk drives may be used in many applications, including personal computers, set-top boxes, video and television applications, audio applications, or some mix thereof. Many applications are still being developed. Applications for hard disk drives are increasing in number, and are expected to further increase in the future.

Recently, in the design of hard disk drives, the drives have been considered analogous to classical communication channels, and error-correcting codes (ECCs) have been applied to the data as it is written to the disk of the drive. Upon subsequent retrieval of the data, the error correcting code is decoded and used to detect and correct any data errors that may have occurred during the process. Thus, modern magnetic disk drives use an error correction code (ECC) to identify and attempt to correct errors in a unit of data, generally a disk sector.

Error correcting codes that are used in hard disk drives or the like can be quite complicated. Generally, error correcting codes are provided by code experts that design the codes for particular hard disk drive characteristics and applications that are specified by a hard disk drive manufacturer. For example, some of the characteristics of the hard disk drive that may be taken into account in the design of a particular ECC are the media noise characteristics of the drive, the fly-height of the heads, which effects the signal-to-noise ratio of the device, the data density at which the data is written to the hard disk drive, and so on.

Typically, the data that is written to the hard disk drive, for example, has a predetermined number of error correcting code (ECC) bits associated with a corresponding predetermined number of data bits. The associated data bits may be referred to, for example, as a data frame or "group". It is well known that the larger the number of ECC bits that are associated with the predetermined number of data bits, the larger the number of errors that can be corrected in the read back data. This is not a linear function, however, since the larger the number of code bits that are used per data frame, the slower the data transfer rate that can be accomplished. Moreover, the larger the number of code bits that are associated with a data frame, the smaller the space that exists on the drive that can contain user data. Thus, generally tradeoffs between the space that would be occupied by the data bit and the accuracy desired may be made over the entire device, or, alternatively, the ECC may be designed to handle the "worst case" type of error that may be experienced in the device.

The errors themselves may be either "hard" or "soft" errors. Hard errors are errors not corrected b the ECC. Soft errors are bit errors seen prior to any ECC correction attempt. A meaningful pattern of ECC bits is calculated by an ECC algorithm, based on the data bits to be written to the sector. When the data is written to the disk, the ECC bits are typically appended to the end of the sector and become an integral part of the data in the sector. When the data in the sector is retrieved, the ECC bits are used to determine if specific data bits are in error and what they should correctly be to a degree of certainty inherent to the power of the algorithm.

SUMMARY OF THE INVENTION

Thus, according to a broad aspect of the invention, a method is presented for performing error correction code operations on data to be read from a hard disk drive. The method includes applying a first error correction code algorithm to a first set of data to be written to the hard disk drive. A second error correction code algorithm, different from the first, is applied to a second set of data to be written to the hard disk drive. The first and second error correction code algorithms may for example produce a different number of error correction code bits for application to said data. The selection between the first and second algorithms may be made, for instance, in dependence upon the physical location on the hard disk drive to which the data is to be written, or in dependence upon the type of said data to be written.

According to another broad aspect of the invention, a hard disk drive system is presented which has a first circuit for applying a first error correction code algorithm to a first set of data to be written to a disk of said hard disk drive, and a second circuit for applying a second error correction code algorithm, different from the first error correction code algorithm, to a second set of data to be written to the disk. A circuit selects between the first and second circuits in dependence upon a predetermined error correction code selection criterion.

In one embodiment, the error correction selection criterion selects which of said first and second algorithms is to be applied in dependence upon the physical location of said data on said hard disk drive. In another embodiment, the error correction selection criterion selects which of said first and second algorithms is to be applied in dependence upon the type of said data to be written to the disk. The first and second error correction code algorithms preferably produces a different number of error correction code bits for application to the data.

According to yet another broad aspect of the invention, a method is presented for operating a hard disk drive in which first a partial response type signal equalization filter is applied to data read from at a first location on the hard disk drive a second partial response type filter, different from said first partial response type filter, is applied to data read from a second location of said hard disk drive. For example, the first partial response type filter can be a PR4 filter, and the second partial response type filter can be an EPR4 filter.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
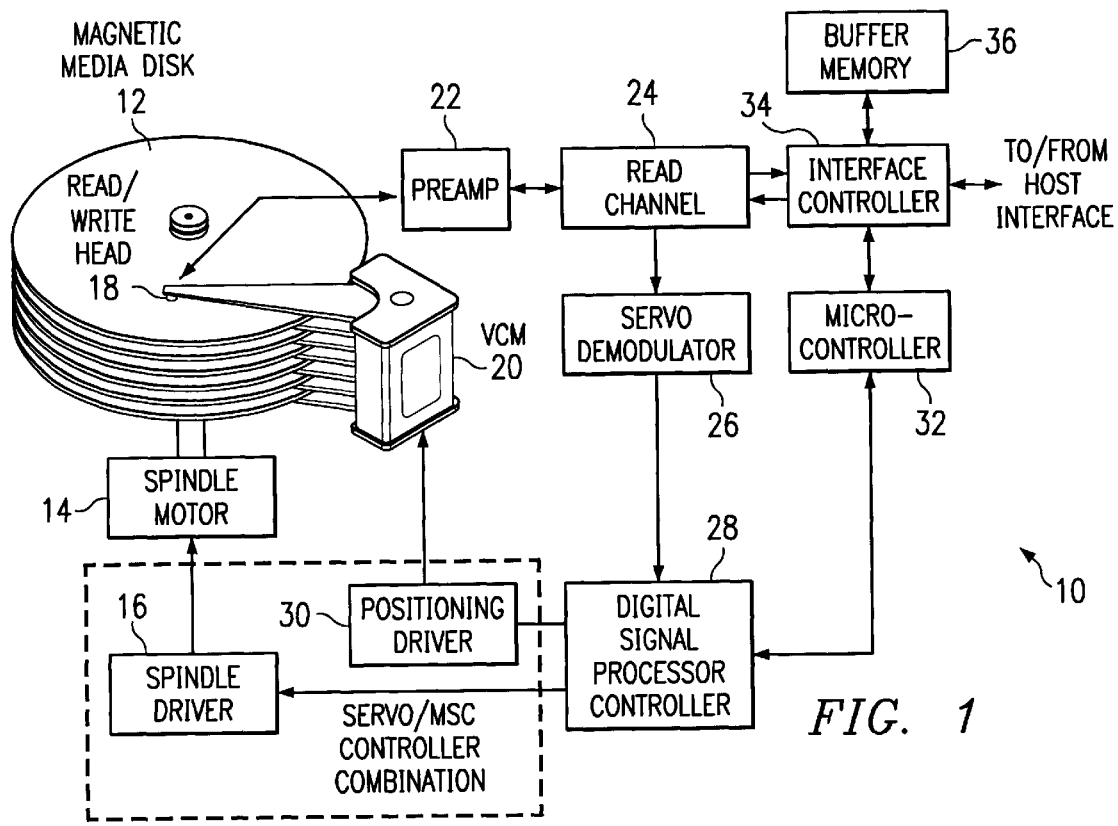
FIG. 1 is a block diagram of a generic disk drive system, which represents the general environment in which the invention may be practiced.

FIG. 1 is a block diagram of a generic disk drive system 10, which represents one general environment in which the invention may be practiced. The system includes one or more magnetic media disks 12 that are rotated by a spindle motor 14 that is controlled by a spindle driver circuit 16. A data transducer or head 18 is locatable along selectable radial tracks, best seen in FIG. 3, of the disks 12 by a voice coil motor 20. The radial tracks may contain magnetic states that contain information about the tracks, such as track identification data, location information, synchronization data, as well as user data.

The head 18 is used to a record user data to and read user data back from the selected one of disks 12. The head 18 also detects signals that identify the tracks and sectors at which data is written, and detects servo bursts that enable the head to be properly laterally aligned with the tracks of the selected disk 12. The head 18 may be, for example, an MR head. The electrical characteristics of an MR read head tends to keep the signal portion of the SNR ratio relatively constant, regardless of theinterface velocity of the head/disk combination.

Analog electrical signals that are generated by the head 18 in response to the magnetic signals recorded on the selected disk 12 are preamplified by a preamplifier 22 for delivery to a read channel circuitry 24. Servo signals are detected and demodulated by one or more servo demodulator circuits 26 and processed by a digital signal processor (DSP) 28 to control the position of the head 18 via the positioning driver circuit 30.

A microcontroller 32 is provided to control the DSP 28, as well as an interface controller 34 to enable data to be passed to and from the host interface (not shown) in known manner. A data memory 36 may be provided to buffer data being written to and read from the disks 12.

Figure 2:
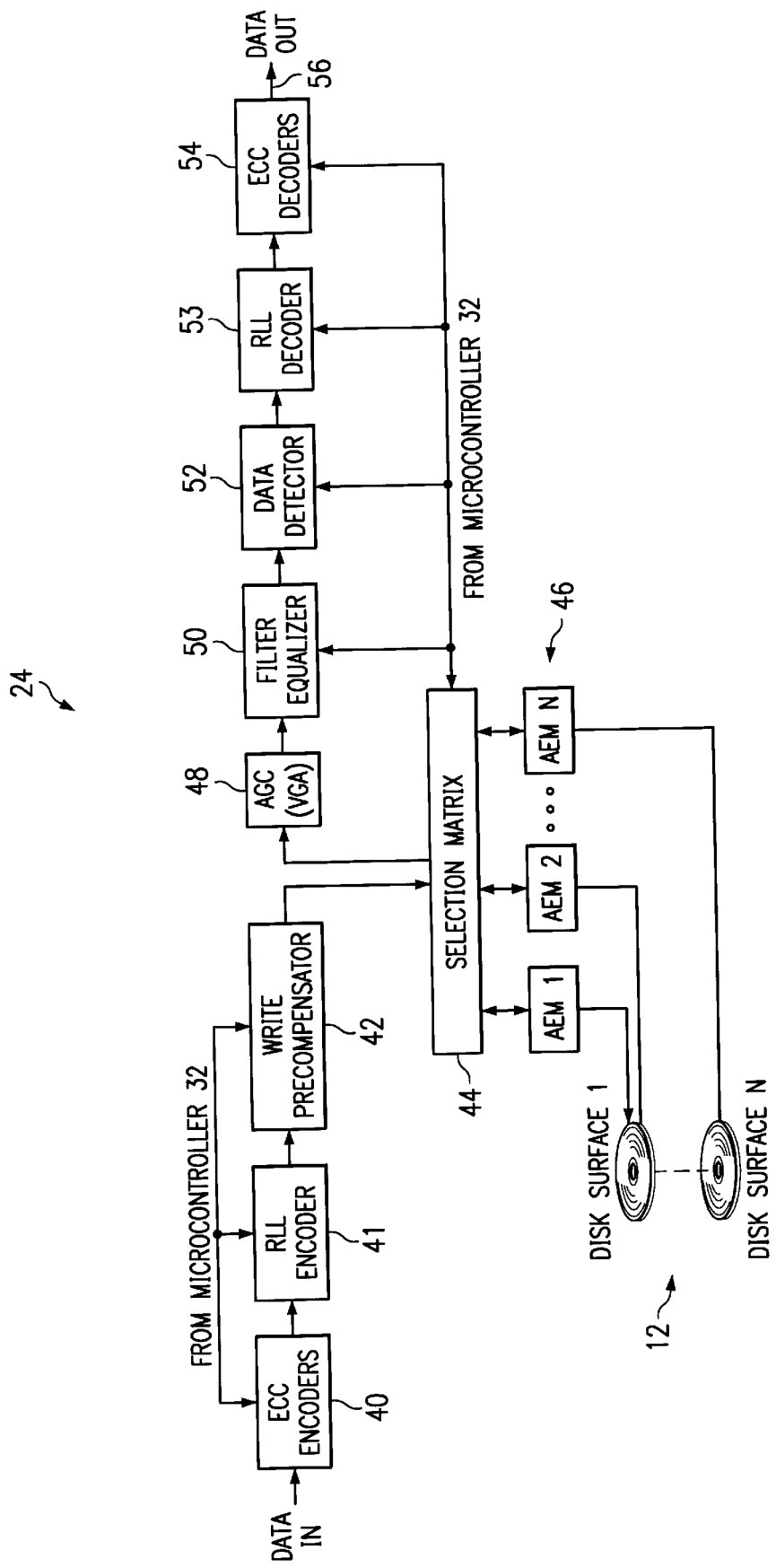
FIG. 2 is a flow chart of a typical channel of a hard disk drive.

A flow chart of a portion of the channel 24, according to a preferred embodiment of the invention, is shown in FIG. 2. The channel 24 controls the data write and read functions to the disks 12 of the drive. In writing data to the disks 12, data is received, for example, from a host interface device and encoded with an error correcting code in an ECC encoder 40, under control, for example of the DSP 28 and microcontroller 32.

According to a preferred embodiment of the invention, the ECC encoder 40 can encode the data using more than one ECC. The ECC encoder 40 may, for example, provide two or more ECC coding strategies or algorithms by which the incoming data may be encoded. The selection of which particular strategy is used may depend upon a number of factors, below described in detail, depending, for example, on the radial location on the disk at which the data is to be written, the data type, and so on.

The encoded data is encoded in a run length limiting encoder 41 conditioned by a write precompensation circuit 42, and is written to a disk selected by a selection matrix or multiplexer 44. In FIG. 2, electronic modules (AEMs) 46 are shown associated with each read/write head to enable write and read operations to be distributed among a plurality of disks 12.

When the data is read back, its magnitude or signal level is adjusted by a variable gain amplifier 48 and is equalized in an equalizing filter 50. The equalized data is then detected by a detector circuit 52 and decoded in an RLL decoder 53, then in an ECC decoder 54, according to the particular error correcting code with which it was originally encoded during the write process, described above. The data may then be delivered on an output line 56 to the host computer, for example, via the interface controller circuit 34.

Figure 3:
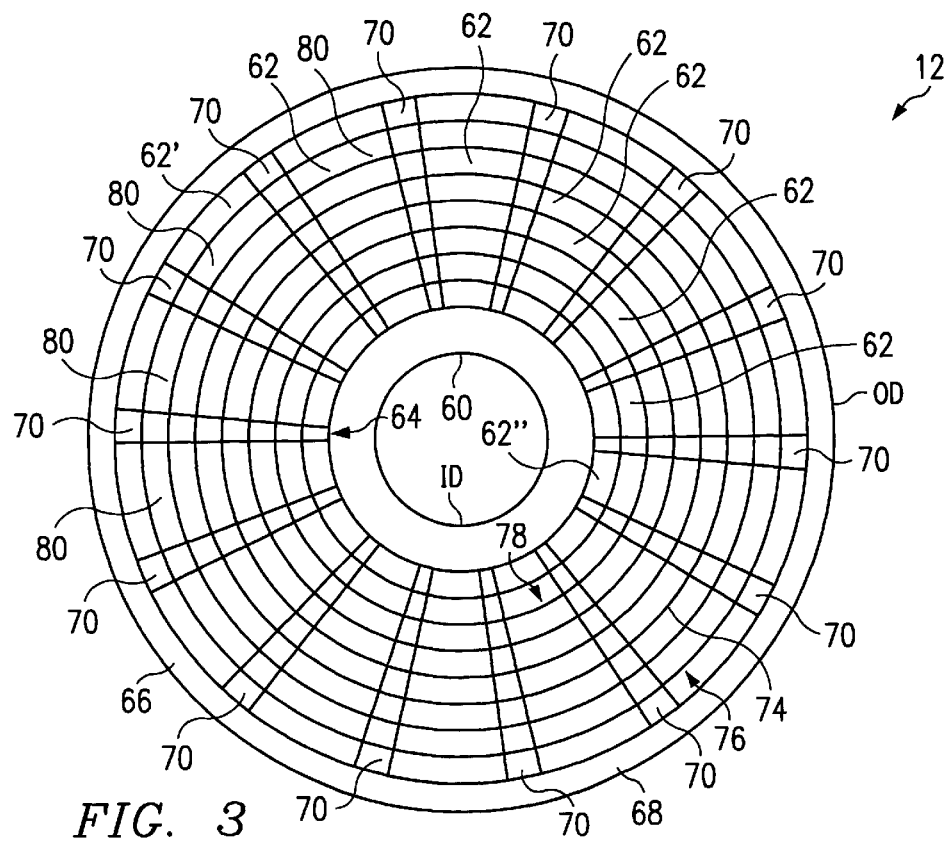
FIG. 3 is a plan view of a typical data storage disk data pattern which includes a multiplicity of concentric data tracks divided into zones or circumferential bands, and a series of radially extending, intersecting servo sectors that interrupt at least some of the data sectors, and showing the use of different error correction codes depending upon the disk location of data and depending upon the type of data.

FIG. 3 is a plan view of a disk data storage surface of one of the disks 12. The storage disk 12 may be formed on a suitable substrate material such as metal or glass. A thin film magnetic storage medium may be vacuum sputter deposited onto the disk. The disk has a central opening 60 to enable a rotating hub to securely clamp the disk to a disk spindle (hub and spindle not shown).

A data storage area is defined by a multiplicity of concentric data tracks 62 between an inner landing zone area 64 and an outer peripheral zone 66. (Other track arrangements may also be equally advantageously employed.) The tracks are arranged into a number of data zones, from the radially outermost zone 62' to the radially innermost zone 62". Although the pattern of the data tracks is shown in FIG. 3, the data tracks are not visible without special processing of the magnetic storage medium. A system information region 68 may lie radially outwardly beyond the outermost zone 62', and diagnostics and guard region may lie inside of the inner landing zone area 68.

FIG. 3 also depicts the pattern of a series of radially extending factory recorded servo sectors 70 equally spaced around the circumference of the disk 12. The number of embedded servo sectors 70 remains invariant throughout the extent of the storage surface. As the servo sectors 70 cut across the data tracks 62, each data sector thereby defined is of fixed storage capacity or length, for instance, 512 bytes of user data.

According to a preferred embodiment of the invention, it is observed that the need for error correction in many applications depends on the frequency and duration of soft errors, which, in turn, may depend upon the radial position of a given sector. Thus, two of the salient aspects of the invention are the need for an ECC for the duration and, frequency of soft errors and the need for an ECC for a given radial location. As a result of this observation, it can be seen that the ability to apply a different ECC strategy to different data types could result in more efficient utilization of the disk's storage capacity. Broadly, the selection of an ECC strategy can be accomplished by selecting an ECC algorithm that encodes and decodes the data in a certain way. The particular selection of interest herein are the speed of decoding and the number of ECC bits required to be associated with each data group or frame.

More particularly, for instance, some types of soft errors encountered in a sector may be dependent on the radial position of the sector. It has been observed that over time small particles that create soft errors may migrate to the outside diameter (OD) of the disk 12 through the centrifugal force created by the spinning disk. The particulate on a disk media can be of two kinds. The first are those that stick to the disk at some location and stay there. The second are those that move around, due to turbulence and the centrifugal force of the spinning disk. The former are detected by the read channel during drive burn-in, or certification by a scanning algorithm. Those areas of the disk with identified debris (defects) may be skipped, or ignored as usable space on the disk, depending upon the severity (bit length) of the defect.

The particles that move about tend to move toward the OD. These particles cause thermal asperity (TA) events when the MR read head impacts with a particle. The MR head experiences a stressed condition from the Joule heating caused by the collision with a particle. The effect is temporary and the head soon cools and returns to its normal signal output level. During the TA event the probability of errors induced in the data stream increases substantially.

Thus, a more powerful ECC capability is desired in those radial regions that have a higher concentration of particulate and thus a higher probability of a TA event, typically toward the OD. Less powerful ECC capability may be acceptable in those regions of less dense particulate, typically toward the ID.

Data rates toward the OD are higher than data rates toward the ID. A TA event of a fixed length of time will affect more data at a higher data rate than at a lower data rate. Thus, a more powerful ECC capability is desired in those radial regions that have a higher data rate.

By compiling information about TA events over time, those radial positions that experience more or longer TA events could be formatted to use a stronger ECC at the expense of storage capacity, while those regions relatively free of TA events could employ a weaker ECC and gain storage capacity.

Another factor influencing the strength of ECC that needs to be employed is the noise in the retrieved signal. Noise can be cataloged generally into two types, media noise and electronic noise. Media noise is due to the imperfect magnetic switching of the thin film media across bit boundaries. Media noise tends to be correlated to the signal written on the track and to the signal written on adjacent tracks. Media noise increases across the radial stroke from ID to OD.

Electronic noise, or Johnson noise, on the other hand, is a function of factors such as temperature, resistance and frequency. Since frequency increases from ID to OD, electronic noise is greatest at the OD. In fact, electronic noise tends to increase faster than media noise for larger form factor disk drives. Today's 3.5 inch form factor drives tend to have more electronic noise at the OD than media noise. This is not the case with smaller form factors. The ECC needed to combat each type of noise is different. This difference is due to the nature of error event distributions associated with each type of noise.

The electronic noise dominant systems tend to recover data better with Viterbi algorithms, since the Viterbi algorithm is designed to be optimal in the presence of additive white Gaussian noise (AWGN). Electronic noise most approximately equates to AWGN. With media noise, Viterbi algorithms tend to create errors with varying duration.

These errors put more pressure on the ECC function to correct the data stream By using a stronger ECC in regions of media noise dominance (toward the ID) recovered data integrity can be increased at the expense of storage capacity. In the electronic noise dominant regions, ECC strength can be relaxed, increasing the usable storage capacity.

In the past, drives were zoned for constant bits per inch linear density (BPI), set radially across the stroke from inner diameter (ID) to outer diameter (OD). Today, however, drives are zoned with variable BPI to take into account radial performance changes in the drive. These factors include the effect of head flying height across the stroke. Head flying heights can typically vary as much as 30% across the radial stroke. Such differences may be by design or due to manufacturing tolerances. The net result is less signal strength as the head flies higher (due to the Wallace spacing loss). The fly height profile is generally known for a disk drive design, so the drive is zoned to account for it, i.e., formatted for higher density in those radial zones where the head flies lower, formatted for lower density in the radial zones where the head flies higher.

Thus, in accordance with a preferred embodiment of the invention, the selection of an appropriate ECC can be adjusted by zone. For example, an ECC that has less overhead, i.e., associates fewer ECC bits with a frame or group of data, can be used when the head is flying lower, and an ECC with a larger overhead when the head is flying higher.

For these and other influences on disk errors it may be desirable to use different ECC strategies at different radial positions of the disk 12. Thus, for example, with reference again to FIG. 3, a first error correcting code may be applied to data that is written to data sectors located inwardly from a preselected boundary 74, and a second error correcting code may be applied to data that is written to data sectors located outwardly from the boundary 74. In the disk error cases described above, for example, the ECC strategies may be selected to use more ECC bits in association with the data located toward the outer radii 76 and fewer ECC bits in association with data located toward the inner radii 78. Despite the above, signal-to-noise ratios of the data signal tend to be stronger toward the outside diameter of a disk due to less intersymbol interference (ISI) because of naturally slimmer pulses. Less dense data signals tend to have fewer errors because of reduced crowding.

Thus, the goal is to optimize consumption of valuable storage capacity by ECC bits, taking into account the nature of the soft errors encountered at a given range of radial position. All of these listed factors contribute to the radial dependence of proper ECC selection to optimize a disk drive product's performance and capacity. Disk drive development revolves around many design trade-offs to achieve the requirements of the product.

Moreover, the need for error correction may be dependent on the type of data being stored in a given sector. For example, computer data files typically cannot tolerate errors. Thus, for instance, a bank's billing system and associated files cannot risk having errors in financial values or persons' names. A disk drive may try continuously to correct an error in such data until successful. Such data is typically corrected and delivered for use asynchronously, where the time taken for correction is prioritized above the time of delivery.

On the other hand, some data types have opposite requirements such that a unit of data must be delivered within a certain time delay after request, even if partially or totally in error. Time-dependent delivery characterizes the data as isochronous. For example, a digital video stream may include a number of frames of data that must be delivered and displayed to the user sequentially and in equal time periods. If the data is not properly delivered, the video may jump and stutter. Typically, a disk drive is allowed a certain amount of time to correct a video frame after which the frame must be sent, even if in gross error. Usually, small errors in a video frame typically are unnoticed by the user.

With the advent of consumer appliance disk drives, the need for streaming video and audio data from the drive allows on-the-fly error correction to be preferred. Too many retries will result in the visual jump and stutter referred to above. Data integrity is not as important as in the computer applications. It is more important to do as good a job as possible in correction, then quickly move on. Therefore, the type of ECC required is very different than that of the computer application. The ECC format overhead can be less than that of the computer application because the raw bit error rate (BER) criteria is really much higher (worse) than that of the computer applications.

Since magnetic disk drives are now being used to store digital computer data, digital video, and other data types, the format of the sectors on a disk must be configured to accommodate the requirements of each type of data expected to be stored. Since the computer data has the strongest error correction requirements, space for the ECC bits must be allocated for all sectors across the disk, whether or not they will inevitably contain computer data or time dependent data. The use of the same ECC bits for the time dependent data may not be necessary given the needs of the data type and may in fact waste storage space.

Thus, according to another preferred embodiment of the invention, it may be desirable to use different ECC strategies for different data types stored on the disk 12. For example, with reference again to FIG. 3, a first error correcting code may be applied to data of a first type that is written to certain data sectors 80, and a second error correcting code may be applied to data of a second type that is written to other data sectors.

It should be appreciated that although the variations in ECC described above were with respect to a boundary between inner and outer radii of the disk 12, or with respect to data of various different types, the different ECC algorithms may be applied in different ways. For example, different error correcting codes of different strengths may be applied on a sector-by-sector basis, or on some other basis, depending upon the particular application, data types involved, and so forth. Also, it should be noted that in some applications, one of the possible modes of operation is that in some disk locations, or with some data types, no ECC at all might be an operational option. Thus, the disk may have regions in which an ECC algorithm is applied to the data therein, and regions with no ECC algorithm applied at all.

Because of the natural pulse slimming effect, described above, using the principles of the invention, a disk drive design may configure the disk's zones with different partial response targets as a function of radial distance. For example, an EPR4 equalization may be selected as the target of the inner zones because the higher ISI and magnetic response in these zones is better matched to the EPR4 characteristics. A PR4 equalization may be used toward the outer diameter (OD) zones because less ISI provides a more robust response for equalization and allows performance gains in read channel timing, gain control and improved servo performance.

The present invention allows the designer to match different ECC strategies with different equalization target resulting in better overall system signal noise ratio (SNR), therefore better (lower) error rates. This would be accomplished by varying the characteristics of the filter 50, for example, in a similar manner as that described above for selecting a particular ECC strategy, dependent upon the radial location of the data to be read. Thus, for example, with reference again to FIG. 3, a first type of equalization, for example, PR4 equalization may be used for data written to the inside radii from a selected boundary 74, and a second type of equalization, such as EPR4 equalization may be used for data written to radii outside the boundary 74. The location of the boundary 74 may be selected using tradeoffs described above.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for performing error correction code operations on data to be read from a hard disk drive, comprising:
    applying a first error correction code algorithm to a first set of data to be written to said hard disk drive;
    recording on said hard disk drive said first set of data after said first error correction code algorithm has been applied;
    applying a second error correction code algorithm, different from said first error correction code algorithm, to a second set of data to be written to said hard disk drive; and
    recording on said hard disk drive said second set of data after said second error correction code algorithm has been applied,
    wherein said applying said first and second error correction code algorithms further comprises selecting which of said first and second algorithms is to be applied in dependence upon the physical location of said data on said hard disk drive, and
    wherein said selecting which of said first and second algorithms is to be applied in dependence upon the physical location of said data comprises selecting an algorithm that associates fewer error correction code bits with data at locations closer to an inner radius of a disk of said hard disk drive and selecting an algorithm that associates more error correction code bits to data at locations closer to an outer radius of said disk.

2. The method of claim 1 wherein said first and second error correction code algorithms produce a different number of error correction code bits for application to said data.

3. The method of claim 1 wherein said applying said first and second error correction code algorithms further comprises selecting which of said algorithms is to be applied in dependence upon the type of said data to be written to said hard disk drive.

4. A method for performing error correction code operations on data to be read from a hard disk drive, comprising:
    applying a first error correction code algorithm to a first set of data to be written to said hard disk drive;
    applying a second error correction code algorithm, different from said first error correction code algorithm, to a second set of data to be written to said hard disk drive;
    wherein said applying said first and second error correction code algorithms further comprises selecting which of said algorithms is to be applied in dependence upon the type of said data to be written to said hard disk drive; and
    wherein said selecting which of said algorithms is to be applied in dependence upon the type of said data to be written comprises selecting an algorithm that associates fewer error correction code bits with data that has a data time delivery priority and selecting an algorithm that associates more error correction code bits with data that has an accuracy delivery priority.

5. A method for operating a hard disk drive comprising:
    applying first a first error correction code to data of a first type to be written to said hard disk drive; and
    applying a second error correction code, different from said first error correction code, to data of a second type to be written to said hard disk drive, wherein said applying said first and second error correction code comprises selecting an algorithm that associates fewer error correction code bits with data that has a data time delivery priority and selecting an algorithm that associates more error correction code bits with data that has an accuracy delivery priority.

6. The method of claim 5 wherein said selecting an algorithm that associates fewer error correction code bits with data that has a data time delivery priority comprises selecting an algorithm to associate error correction code bits with video data.

7. The method of claim 5 wherein said selecting an algorithm that associates more error correction code bits with data that has a data accuracy delivery priority comprises selecting an algorithm to associate error correction code bits with user data.

8. A hard disk drive system, comprising:
- a first circuit for applying a first error correction code algorithm to a first set of data to be written to a disk of said hard disk drive;
- a circuit for recording on said hard disk drive said first set of data after said first error correction code algorithm has been applied;
- a second circuit for applying a second error correction code algorithm, different from said first error correction code algorithm, to a second set of data to be written to said disk;
- a circuit for recording on said hard disk drive said second set of data after said second error correction code algorithm has been applied; and
- a circuit for selecting between said first and second circuits in dependence upon a predetermined error correction code selection criterion,
- wherein said selection criterion selects a first number of error correction code bits for association with data at first locations a disk of said hard disk drive at locations closer to an inner radius of said disk from a selection boundary, and selects a second number, larger than said first number, of error correction code bits to associate with data at locations closer to an outer radius of said disk from said selection boundary.

9. The system of claim 8 wherein said first and second error correction code algorithms produce a different number of error correction code bits for application to said data.

10. The system of claim 8 wherein said selection criterion selects which of said first and second algorithms is to be applied in dependence upon the physical location of said data on said hard disk drive.

11. The system of claim 8 wherein said selection criterion selects between said first and second error correction code algorithms in dependence upon the type of said data to be written to said disk.

12. A hard disk drive system, comprising:
- a first circuit for applying a first error correction code algorithm to a first set of data to be written to a disk of said hard disk drive;
- a second circuit for applying a second error correction code algorithm, different from said first error correction code algorithm, to a second set of data to be written to said disk;
- and a circuit for selecting between said first and second circuits in dependence upon a predetermined error correction code selection criterion,
- wherein said selection criterion selects between said first and second error correction code algorithms in dependence upon the type of said data to be written to said disk, and
- wherein said selection criterion selects an algorithm that associates fewer error correction code bits with data that has a data time delivery priority and selects an algorithm that associates more error correction code bits with data that has an accuracy delivery priority.

\* \* \* \* \*